3,830,883
POLYMERISATION PROCESS
Alan Charles Sturt, Guildford, England, assignor to
BP Chemicals Limited, London, England
No Drawing. Filed Mar. 9, 1971, Ser. No. 122,532
Claims priority, application Great Britain, Mar. 9, 1970,
11,071/70
The portion of the term of the patent subsequent to
May 16, 1989, has been disclaimed
Int. Cl. C08f 1/11, 3/30
U.S. Cl. 260—92.8 W                6 Claims

ABSTRACT OF THE DISCLOSURE

Non film forming polymers are isolated from an aqueous emulsion stabilised by means of a carboxylic acid salt by acidification and agglomerisation of polymer particles in the presence of a volatile softening agent and a suspending agent.

---

The present invention relates to a process for the production of vinyl chloride polymers by the polymerisation of vinyl chloride in aqueous dispersion. It particularly relates to the recovery of such polymers from the aqueous polymerisation reaction mixture.

The polymerisation of vinyl chloride in aqueous dispersion is well known. When the dispersion and the produced vinyl chloride polymer is in the form of fine droplets or particles which have been stabilised by means of emulsifying agents and the like to such an extent that the aqueous dispersion is stable when any mechanical stirring used to maintain it is stopped, the polymerisation process is known as emulsion polymerisation. When the dispersion and the produced vinyl chloride polymer is in the form of larger droplets or particles which coalesce and settle out from the aqueous phase when the mechanical stirring is stopped, the polymerisation process is known as suspension polymerisation. Suspension stabilizer systems are usually present in a suspension process in order to control the particle size and to ensure that the suspension does not break down during polymerisation. The instability of many suspension polymerisation processes is particularly marked in the initial stage of the polymerisation, i.e. before 50% polymerisation is achieved.

Emulsion polymerisation has certan advantages over suspension polymerisation in that it can readily be operated with little reactor fouling at a high ratio of monomeric/polymeric material to aqueous phase. Moreover, if the emulsifying agent employed is a salt of a saturated fatty acid, the latter can easily be incorporated in the vinyl chloride polymer and act as a lubricant therefor. However, in the isolation of the product, it is difficult to eliminate fine particles which render the final product difficult to handle. Also the techniques employed for the isolation of the final solid product from the polymer emulsion, e.g. spray drying, are expensive to operate and frequently affect the properties of the isolated polymer.

An object of the present invention is to provide an improved process for polymerisation of vinyl chloride in aqueous dispersion and the isolation of the polymer from the aqueous phase. A further object is to provide such a process which gives rise to vinyl chloride polymers having a good plasticiser uptake, i.e. they can absorb useful quantities of plasticiser and still appear dry and retain their particulate form.

Accordingly the present invention is a process which comprises polymerising vinyl chloride under aqueous emulsion polymerisation conditions, using a saturated fatty acid soap emulsifying agent, carrying out the following steps (a), (b) and (c) in any order;

(a) allowing the emulsion polymer particles to adsorb vinyl chloride monomer, (b) causing the emulsion polymer particles to form relatively larger dispersed agglomerates, (c) adding a suspension stabiliser system, and separating the agglomerates from the aqueous phase after the emulsion polymer particles in the agglomerates have cohered due to the action of the vinyl chloride.

The vinyl chloride in the emulsion polymerisation may, if desired, be mixed with other monomers that are copolymerisable therewith, provided that the formed copolymer is a non-film-forming copolymer, i.e. is incapable of forming a coherent film when deposited on a suitable substrate from an aqueous emulsion thereof and allowed to dry at a temperature below about 10° C., say 5–10° C. Examples of suitable comonomers are acrylate esters such as methyl methacrylate and ethyl acrylate, vinyl esters such as vinyl acetate, vinylidene chloride, ethylene and propylene.

The emulsion polymerisation stage of the process must be carried out in the presence of one of the aforementioned emulsifying agents. Examples of such agents are the alkali metal or ammonium salts of lauric, stearic, palmitic and myristic acids. Emulsion polymerisation techniques are well known and are, for example, described in volume IX of the series of monographs on the Chemistry, Physics and Technology of High Polymeric Substances published by Interscience Publishers, Inc., New York.

Conventional components of vinyl chloride polymerisation may be present in the emulsion polymerisation stage of the present invention, e.g. polymerisation initiator systems (preferably water-soluble), molecular weight modifiers and the like. Conventional phase ratios of organic to aqueous phases can be employed.

The emulsion polymer is either present as an emulsified latex or as a suspension of relatively larger particles formed by agglomerating the emulsion polymer particles when it absorbs the vinyl chloride depending on whether step (a) precedes or follows step (b).

The quantity of vinyl chloride present during the agglomeration stage of the process of the present invention is preferably not greater than the amount that the emulsion vinyl chloride polymer can absorb under the prevailing conditions, although larger amounts can be employed if desired. It is believed that provided sufficient vinyl chloride is absorbed in the surface of the emulsion polymer particles to render them soft they will cohere and stabilise the agglomerates. The stabilized agglomerates have sufficient stability to be separated from the aqueous phase as such without breaking down into the original small sized particles. In practice the ratio by weight of vinyl chloride monomer to vinyl chloride polymer when the agglomeration is carried out is in the range of 50:50 to 3:97 and preferably 25:75 to 5:95.

In one embodiment of the process according to the present invention the vinyl chloride used in the second stage of the process is part of the vinyl chloride present during the emulsion polymerisation stage. The vinyl chloride emulsion polymer absorbs vinyl chloride as it is formed and thus during the emulsion polymerisation stage a point will arise when the formed vinyl chloride polymer will have absorbed therein a proportion of vinyl chloride. Thereafter steps (b) and (c) of the process of the present invention can be carried out to complete the agglomeration of the emulsion polymer particles prior to their isolation.

In order to cause the emulsion polymer particles to agglomerate according to step (b) of the process according to the present invention, the conditions in the emulsion system have to be altered. For example, in appropriate cases dilution of the emulsion with water or an alteration of the degree of agitation in the system will cause the agglomeration to take place. Care must be taken to ensure that the change of conditions in the aqueous emulsion is not so great as to cause complete agglomeration of the polymer and thus its uncontrolled separation from the aqueous phase. Vinyl chloride can be added during the agglomeration step or after this step has been completed.

The agglomeration of the emulsion polymer particles may be brought about by reducing the efficiency of the emulsifying agent employed by, for example, adding multivalent ions, e.g. calcium or aluminium ions, to the system. In a preferred embodiment of the present invention the emulsion system is destroyed by the addition of a relatively strong acid to the system i.e. an acid that is stronger than the carboxylic acid from which the soap emulsifying agent was formed.

A suspension stabiliser system is added to the dispersion in order to prevent uncontrolled coagulation of the dispersed polymer phase and/or to control the properties of the final product. Suspension stabiliser systems are well known and can contain suspending agents of the organic or inorganic type and can be water soluble or insoluble. Examples of suitable organic suspending agents are polyvinyl alcohol, partially hydrolysed polyvinylacetates, a soluble salt of a styrene-maleic anhydride copolymer, gelatin, cellulose ethers such as methyl cellulose, hydroxypropyl methyl cellulose and hydroxyethyl cellulose. Examples of inorganic suspending agents are sparingly soluble metal phosphates such as hydroxy apatite. Mixtures of organic and inorganic suspending agents and of water soluble and insoluble suspending agents can be used.

The vinyl chloride is allowed to evaporate either before or after the stabilised agglomerates have been separated from the aqueous phase. Alternatively it may be removed during the separation step. It is generally convenient to allow most of the vinyl chloride to evaporate before the polymer is separated from the aqueous phase.

The temperature at which the various steps (a), (b) and (c) are carried out does not appear to be critical, provided, of course, that the temperature used is not below the freezing point of the aqueous phase (which may contain anti-freeze ingredients) or above the point at which the polymer is degraded.

The emulsion polymer may be mixed with other emulsion polymers before the agglomeration. This technique can lead to the production of useful blended products. Useful blends can be formed by adding to the emulsion vinyl chloride polymer any of the known polyvinyl chloride additives that are available in aqueous dispersion. Examples of such additives are toughening agents such as methacrylate/polybutadiene/styrene copolymers and acrylonitrile/polybutadiene/styrene copolymers (ABS) and process aids such as styrene/acrylonitrile copolymers and polymethyl methacrylate. A film-forming polymer that can usefully be added to polyvinyl chloride is polychloroprene.

The product of the process of the present invention can be isolated by the means conventionally used for suspension polymers. The products behave like conventional suspension polymers in that they can be recovered by simple filtration or decantation techniques and moreover the agglomerates retain their identity in suitable recovery processes. This is in marked contrast to the polymeric material recovered from conventional emulsion polymerisation processes by coagulation of the polymer latex.

The products of the process of the present invention have excellent plasticiser absorption properties, i.e. they can absorb large quantities of liquid plasticisers while retaining their particulate form. It is found that if the process of the present invention is repeated in the absence of the suspension stabiliser, the final product has inferior plasticiser absorption properties. Surprisingly with a vinyl chloride emulsion polymer that has been prepared by the use of an emulsifying agent other than the soap emulsifying agents used in the process of the present invention, the presence or absence of a suspending agent made no difference to the plasticiser uptake properties of the final product obtained by treating the emulsion polymer according to the steps of the process of the present invention.

The present invention is illustrated by the following examples, the parts referred to being by weight. In examples 1 to 5 the PVC latex employed had a particle size in the range 0.05 to 0.3$\mu$ and had been prepared by the emulsion polymerisation of vinyl chloride using approximately 3 parts of ammonium stearate as the emulsifying agent per hundred parts of vinyl chloride. The polymerisation was carried out at 62° C. using an initiator formed from ammonium persulphate and sodium metabisulphite.

EXAMPLE 1

A vinyl chloride polymer was made with the following recipe

| | | |
|---|---|---|
| Vinyl chloride | g | 350 |
| PVC latex (34.5% solid) | g | 1,100 |
| Alcotex 88–10* | g | 7 |
| Distilled water | g | 2,050 |
| Acetic acid (10% w./w.) | ml | 50 |

*Polyvinyl alcohol, 88% hydrolysis, medium viscosity.

The polyvinyl alcohol was dissolved in the water, and this solution was mixed with the latex in a stainless steel reactor. The reactor was then purged with nitrogen and evacuated. The vinyl chloride was sucked in and the mixture stirred at 120 r.p.m. for 40 minutes during the last 10 minutes of which the acetic acid solution was pumped in. The stirrer speed was increased to 700 r.p.m. and the charge heated to 60° C. for 6 hours. At the end of that time the charge was cooled and vented to atmosphere.

The product was easily filtered and gave a clear filtrate. Microscopic examination of the dried agglomerates showed that the sizes ranged from 50 to 300$\mu$. The product had good plasticiser uptake properties, being capable of absorbing more than 60% its own weight of di-octyl phthalate without losing its particulate form.

By way of contrast the process was repeated in the absence of the polyvinyl alcohol suspending agent. The product obtained has a particle size in the range 20–150$\mu$ and exhibited substantially lower plasticiser uptake.

EXAMPLE 2

A vinyl chloride polymer was made with the following recipe

| | | |
|---|---|---|
| Vinyl chloride | g | 350 |
| PVC latex (34.5% solids) | g | 1,100 |
| Distilled water | g | 2,050 |
| Alcotex 88–10* | g | 7 |
| Acetic acid (10% w./w.) | ml | 50 |

*Polyvinyl alcohol, 88% hydrolysis, medium viscosity.

1,550 g. of distilled water and all the latex were charged into a stainless steel reactor. The reactor was purged with nitrogen and the mixture stirred at 120 r.p.m. for 10 minutes. Next the acetic acid solution was pumped in with stirring over a further 10 minute period. The stirrer speed was increased to 700 r.p.m. and the mixture stirred for 10 minutes. After evacuation of the reactor, the vinyl chloride was sucked in. The mixture was stirred at 700 r.p.m. for 10 minutes. A solution of the polyvinyl alcohol in 500 ml. of distilled water was pumped into the reactor with stirring over a further 30 minute period. The charge was heated to 60° C. and held at this temperature with stirring for 6 hours. At the end of this period the reactor was vented to atmosphere.

The product was separated from the aqueous phase by basket centrifuge and the aqueous liquor had a solids content of 0.1%. Microscopic examination of the dried agglomerates showed that their sizes were in the range 20 to 150$\mu$.

The product had similar plasticiser uptake properties to the product of example 1. Repetition of the process without adding the polyvinyl alcohol solution gave a product having a particle size in the range 10–70μ which formed a slurry with dioctyl phthalate (10 grams polymer–6 grams plasticiser).

EXAMPLE 3

A vinyl chloride polymer was made with the following recipe

| | | |
|---|---|---|
| Vinyl chloride | g | 350 |
| PVC latex (34.5% solids) | g | 1,100 |
| Distilled water | g | 2,050 |
| Alcotex 88–10* | g | 7 |
| Acetic acid (10% w./w.) | ml | 50 |

*Polyvinyl alcohol, 88% hydrolysis, medium viscosity.

1,550 g. of distilled water and the latex were charged into a stainless steel reactor which was purged with nitrogen and evacuated. The vinyl chloride was sucked into the reactor and the mixture stirred at 120 r.p.m. for 10 minutes. A solution of the polyvinyl alcohol in 500 ml. of distilled water was pumped into the reactor with stirring over a further 30 minute period. After stirring the mixture for a further 10 minutes, the acetic acid solution was pumped in over a further 10 minute period. The stirrer speed was increased to 700 r.p.m. and the mixture stirred for 6 hours after which the reactor was vented to the atmosphere.

The product was separated from the aqueous phase by basket centrifuge and gave a clear aqueous liquor. Microscopic examination of the dried agglomerates showed their sizes were in the range 20–200μ.

EXAMPLE 4

A vinyl chloride polymer was made with the following recipe

| | | |
|---|---|---|
| Vinyl chloride | g | 350 |
| PVC latex (34.5% solid) | g | 1,100 |
| Distilled water | g | 2,050 |
| Alcotex 88–10* | g | 7 |
| Acetic acid (10% w./w.) | ml | 50 |

*Polyvinyl alcohol, 88% hydrolysis, medium viscosity.

1,550 g. of distilled water and the latex were charged into a stainless steel reactor which was purged with nitrogen. The reactor was evacuated and the mixture was stirred at 120 r.p.m. for 10 minutes. Next the acetic acid solution was pumped in with stirring over a further 10 minute period. The stirrer speed was increased to 700 r.p.m. and the mixture stirred for another 10 minutes. After that the reactor was re-evacuated and the vinyl chloride sucked in. A solution of the polyvinyl alcohol in 500 ml. of distilled water was pumped into the reactor while stirring at 700 r.p.m., and stirring was then continued for a further 8 hours. At the end of this period the reactor was vented to atmosphere.

The product was easily separated from the aqueous phase by basket centrifuge and gave a clear filtrate which contained virtually no solid material. Microscopic examination of the dried agglomerates showed that their size ranged from 10 to 100μ.

EXAMPLE 5

A vinyl chloride polymer was prepared with the following recipe

| | |
|---|---|
| | G. |
| Vinyl chloride | 350 |
| PVC latex (34.5% solid) | 1,100 |
| Distilled water | 2,050 |
| Alcotex 88–10* | 7 |

*Polyvinyl alcohol, 88% hydrolysis, medium viscosity.

1,500 g. of distilled water and the PVC latex were poured into a 1 gallon stainless steel reactor which was then closed, purged and evacuated. The vinyl chloride was sucked into the reactor and the mixture stirred at 700 r.p.m. for 10 minutes. Next a solution of the polyvinyl alcohol in 500 ml. of distilled water was pumped into the reactor. The charge was then heated at 60° C. still stirring at 700 r.p.m. for 8 hours. The reactor was then cooled and vented to atmosphere. The product was easily separated from the aqueous phase by basket centrifuge and gave a clear filtrate which contained no solid material. Microscopic examination of the dried agglomerates showed that their sizes ranged from 10 to 60μ.

The products of examples 3 to 5 inclusive all had good plasticiser uptake equivalent to at least 60% of their own weight.

EXAMPLE 6

The following ingredients were employed:

| | | |
|---|---|---|
| Vinyl chloride | g | 30 |
| Distilled water | g | 1,100 |
| PVC latex (31.6% solids) | g | 1,800 |
| Glacial acetic acid | ml | 85 |
| Cellosize QP 4400 (hydroxyethyl cellulose) | g | 85 |
| Methocell 65HG (hydroxypropyl methyl cellulose) | g | 3.5 |

The PVC latex was prepared by carrying out the emulsion polymerisation of vinyl chloride at 50° C. using an initiator system based on ammonium persulphate and sodium metabisulphite. The emulsifiers in the latex were ammonium palmitate and myristate (2 parts of each per hundred of monomer).

The Cellosize and Methocell were dissolved in the distilled water and the latex was added to the stirred solution. The mixture was charged into a stainless steel reactor which was sealed. The reactor was purged with nitrogen and the mixture stirred at 200 r.p.m. for 10 minutes. Next the acetic acid was pumped in with stirring over a further 10 minute period. After evacuation of the reactor, the vinyl chloride was sucked in. The mixture was stirred at 700 r.p.m. at 20° C. for 1 hour. At the end of this period, the reactor was vented to atmosphere.

The product was easily separated from the aqueous phase by basket centrifuge and gave a clear filtrate. It was then washed with water in the centrifuge and dried in a vacuum oven at 45° C. The product absorbed up to its own weight of plasticiser before forming a viscous paste.

EXAMPLE 7

The following ingredients were employed:

| | | |
|---|---|---|
| Vinyl chloride | g | 100 |
| Distilled water | g | 1,200 |
| PVC latex (29% solids) | g | 2,000 |
| Phosphoric acid (20%) | ml | 400 |
| Cellosize QP 4400 | g | 3.5 |
| Methocell 65HG | g | 3.5 |

The PVC latex was prepared by carrying out the emulsion polymerisation of vinyl chloride at 60° C. using an initiator system based on ammonium persulphate and sodium metabisulphite. The emulsifier in the latex was ammonium laurate (2½ parts per 100 monomer).

The latex and 700 g. of distilled water were charged into a stainless steel reactor which was then closed. The mixture was then stirred at 200 r.p.m. for 20 minutes. During the first 10 minutes the phosphoric acid solution was added and during the latter 10 minutes a solution of the Cellosize and Methocell in 50 g. of distilled water was added. After purging the reactor with nitrogen and then evacuating, the vinyl chloride was sucked in. The charge was then stirred at 700 r.p.m. for 1 hour. At the end of this period the reactor was vented to atmosphere.

The product was easily separated from the aqueous phase by basket centrifuge and gave a clear filtrate. It was then washed with water in the centrifuge and dried in a vacuum oven at 45° C. It had good plasticiser uptake.

EXAMPLE 8

The following ingredients were employed:

| | G. |
|---|---|
| Vinyl chloride | 350 |
| PVC latex (31.1% solids) | 1,130 |
| Distilled water | 2,500 |
| Phosphoric acid (60% w./v.) | 80 |
| Methocell 65HG | 3.5 |
| Cellosize QP440 | 3.5 |

The PVC latex was prepared by carrying out the emulsion polymerisation of vinyl chloride at 60° C. using an initiator system based on ammonium persulphate and sodium metabisulphite. The emulsifier in the latex was potassium laurate (3 parts per 10 monomer).

The latex and 1,500 g. of the distilled water were charged to a stainless steel reactor. The reactor was sealed and purged with nitrogen. After evacuation of the reactor, the vinyl chloride was sucked in. The mixture was stirred at 200 r.p.m. for 40 minutes. During the first ten minutes the phosphoric acid was pumped into the reactor. During the remainder of the period, a solution of the Methocell 65HG and Cellosize QP 4400 in the remaining distilled water was pumped into the reactor. The stirrer speed was increased to 700 r.p.m. and the charge stirred at 20° C. for 10 minutes. At the end of this period, the reactor was vented to atmosphere. The product was easily separated from the aqueous phase by basket centrifuge and gave a clear filtrate. It was then washed with water in the centrifuge and dried in a vacuum oven at 45° C.

EXAMPLE 9

The following ingredients were employed:

| Vinyl chloride | g | 85 |
|---|---|---|
| PVC latex (27% solids) | g | 1,800 |
| Distilled water | g | 1,300 |
| Calcium chloride (10% aqueous solution) | ml | 300 |
| Gohsenol (polyvinyl alcohol) | g | 7 |

The PVC latex was prepared by carrying out the emulsion polymerisation of vinyl chloride at 60° C. using an initiator system based on ammonium persulphate and sodium metabisulphite. The emulsifier in the latex was ammonium stearate (3 parts per hundred monomer).

The method adopted in this example was similar to that in example 8 except that the coagulant was calcium chloride instead of phosphoric acid and that the suspending agent was Gohsenol instead of Methocell 65HG and Cellosize QP 4400. The product was easily separated from the aqueous phase by basket centrifuge and gave a clear filtrate. It was then washed with water in the centrifuge and dried in a vacuum oven at 45° C. It had good plasticiser uptake.

EXAMPLE 10

The following ingredients were employed:

| Vinyl chloride | g | 190 |
|---|---|---|
| Distilled water | g | 2,000 |
| PVC latex (30.3% solids) | g | 1,890 |
| Gohsenol | g | 7 |
| Phosphoric acid (20%) | ml | 90 |

The PVC latex was prepared by carrying out the emulsion polymerisation of vinyl chloride at 60° C. using an initiator system based on ammonium persulphate and sodium metabisulphite. The emulsifier in the latex was potassium laurate (3 parts per hundred monomer).

The method adopted in this example was similar to that in example 6 except that the coagulant was phosphoric acid instead of acetic acid and that the suspending agent was Gohsenol instead of Cellosize and Methocell. The charge was stirred for 10 minutes instead of 1 hour. The product was easily separated from the aqueous phase by basket centrifuge and gave a clear filtrate. It was then washed with water in the centrifuge and dried in a vacuum oven at 45° C. It had good plasticiser uptake and absorbed its own weight of dioxtyl phthalate before forming a viscous paste.

EXAMPLE 11

The following ingredients were employed:

| Vinyl chloride | g | 1,000 |
|---|---|---|
| Distilled water | g | 2,600 |
| Stearic acid | g | 60 |
| Ammonia (0.88) | ml | 70 |
| Ammonium persulphate | g | 0.2 |
| Sodium metabisulphite | g | 0.05 |
| Alcotex 88–10 (Polyvinyl alcohol) | g | 5 |
| Glacial acetic acid | ml | 80 |

The ammonia and stearic acid (forming ammonium stearate), ammonium persulphate, sodium metabisulphite and 2,000 g. of the distilled water were charged into a stainless steel reactor which was purged with nitrogen and evacuated. The vinyl chloride was sucked in and the charge stirred at 300 r.p.m. Polymerisation was initiated and maintained by heating the charge at 50° C. for 6 hours. After this period the conversion of vinyl chloride was 93%. The reactor was cooled to 20° C. and a solution of the Alcotex 88–10 in 200 g. of distilled water followed by the glacial acetic acid and the remaining distilled water were pumped into the reactor. The stirrer speed was increased to 700 r.p.m. for 10 minutes. After this period the vinyl chloride was vented to atmosphere.

The product was easily separated from the aqueous phase by basket centrifuge and gave a clear filtrate. It was then washed with water in the centrifuge and dried in a vacuum oven at 45° C. It had a good plasticiser uptake and absorbed 8 grams di-octyl phthalate per 10 grams polymer before forming a viscous paste.

I claim:
1. A process which comprises polymerising vinyl chloride in aqueous emulsion using a saturated fatty acid emulsifying agent, carrying out the following steps (a), (b) and (c) in any order:
   (a) absorbing vinyl chloride monomer in the emulsion polymer particles,
   (b) agglomerating the emulsion polymer particles and agitating to form relatively larger dispersed agglomerates,
   (c) adding a suspension stabiliser system,
and separating the agglomerates from the aqueous phase when the polymer particles in the agglomerates have cohered due to the action of the vinyl chloride.

2. A process as claimed in claim 1 wherein the saturated fatty acid soap emulsifying agent is an alkali metal or ammonium salt of lauric, stearic, *palmitic* and myristic acid.

3. A process as claimed in claim 1 wherein the ratio by weight of vinyl chloride monomer to vinyl chloride polymer when the agglomeration is carried out is in the range 50:50 to 3:97.

4. A process as claimed in claim 1 wherein the vinyl chloride used in the second stage of the process is part of the vinyl chloride present during the emulsion polymerisation.

5. A process as claimed in claim 1 wherein the emulsion polymer particles are caused to form relatively larger dispersed agglomerates by the addition of an acid to the system that is strong relative to the acid from which the emulsifying agent is formed.

6. A process as claimed in claims wherein the suspension stabiliser system comprises polyvinyl alcohol, partially hydrolysed polyvinyl acetates, a soluble salt of a styrene/maleic an hydride copolymer, gelatin, methyl cellulose, hydroxypropyl methyl cellulose and hydroxyethyl cellulose.

References Cited

UNITED STATES PATENTS

| | | | |
|---|---|---|---|
| 3,725,375 | 4/1973 | Sturt | 260—92.8 W |
| 3,370,105 | 2/1968 | De Bell | 260—880 |
| 3,436,440 | 4/1969 | Abe et al. | 260—880 |
| 3,318,831 | 5/1967 | Gauslaa | 260—29.7 |
| 3,527,857 | 9/1970 | Fitz et al. | 264—117 |
| 3,591,671 | 7/1971 | Burt et al. | 264—117 |

FOREIGN PATENTS

| | | | |
|---|---|---|---|
| 980,990 | 1/1965 | Great Britain | 264—117 |

JOSEPH L. SCHOFER, Primary Examiner

J. KIGHT III, Assistant Examiner

U.S. Cl. X.R.

260—29.6 PT, PM, 879, 880

UNITED STATES PATENT OFFICE
CERTIFICATE OF CORRECTION

Patent No. 3,830,883                     Dated August 20, 1974

Inventor(s) ALAN CHARLES STURT

It is certified that error appears in the above-identified patent and that said Letters Patent are hereby corrected as shown below:

Col. 6, Example 6, line 19, should read,
"Cellosize QP 4400 (hydroxyethyl cellulose)--g--3.5"

Signed and sealed this 12th day of November 1974.

(SEAL)
Attest:

McCOY M. GIBSON JR.　　　　　　　　C. MARSHALL DANN
Attesting Officer　　　　　　　　　Commissioner of Patents